United States Patent [19]

Frey et al.

[11] Patent Number: 4,616,527

[45] Date of Patent: Oct. 14, 1986

[54] REMOTE ACTUATOR

[75] Inventors: Mark W. Frey, Mason; Dallas E. King, Centerville; William C. Staker, Springfield, all of Ohio

[73] Assignee: General Motors Corporation, Detroit, Mich.

[21] Appl. No.: 690,968

[22] Filed: Jan. 14, 1985

[51] Int. Cl.[4] ........................ F16H 57/00; F16H 57/02

[52] U.S. Cl. ........................................ 74/625; 74/405; 74/411; 74/421 A; 74/606 R

[58] Field of Search ................ 292/201 R, 336.3, 347; 74/89.17, 405, 406, 411, 421 R, 421 A, 422, 606 R, 625

[56] References Cited

U.S. PATENT DOCUMENTS

| | | | |
|---|---|---|---|
| 2,394,384 | 2/1946 | Horstmann | 74/625 |
| 2,581,171 | 1/1952 | Carlson | 74/422 |
| 2,876,652 | 3/1959 | Pankonin | 74/422 |
| 3,717,954 | 2/1973 | Sheckells | 74/606 R |
| 3,860,844 | 1/1975 | Hetzel | 74/606 R |
| 3,954,016 | 5/1976 | Sarosy et al. | 74/422 |
| 4,269,440 | 5/1981 | Gelhard | 292/336.3 |
| 4,272,112 | 6/1981 | Schlick et al. | 292/201 R |
| 4,290,634 | 9/1981 | Gelhard | 292/201 R |
| 4,342,209 | 8/1982 | Kleefeldt | 70/264 |
| 4,364,249 | 12/1982 | Kleefeldt | 292/201 R |
| 4,502,718 | 3/1985 | Sasaki et al. | 292/201 R |

FOREIGN PATENT DOCUMENTS

| | | | |
|---|---|---|---|
| 2847588 | 5/1980 | Fed. Rep. of Germany | 292/336.3 |

*Primary Examiner*—Lawrence J. Staab
*Attorney, Agent, or Firm*—Schwartz Saul

[57] ABSTRACT

A remote actuator for an automobile power door lock application has a housing, a first gear reduction stage in a first tier in the housing, a second gear reduction stage in a second tier in the housing, a reversible pancake-type electric motor in the second tier in the housing operative to drive the second gear means through the first gears with two stages of gear reduction between respective ones of a pair of parked positions, a linear actuator in the housing in a third tier thereof movable in extending and retracting directions between positively defined limits, and a rotary detent clutch between the second gear means and the linear actuator operative to move the latter in the one of the extending and retracting directions corresponding to the direction of rotation of the second gear means and to release the linear actuator at either of the limits thereby to permit overdrive of the second gear means to the corresponding one of the parked positions.

2 Claims, 4 Drawing Figures

REMOTE ACTUATOR

BACKGROUND OF THE INVENTION

1. Field of the Invention

This invention relates generally to remote actuators for automobile door or body mounted devices and, more particularly, to an improved door lock actuator especially suited for minimum space consumption and for automated assembly.

2. Description of the Prior Art

In automobiles, power operated conveniences such as power windows or power door locks usually require remote actuators. In a power door lock proposal, for example, illustrated in U.S. Pat. No. 3,954,016, issued May 4, 1976 to Sarosy et al and assigned to the assignee of this invention, a lock/unlock lever of a door mounted latch assembly is moved between locked and unlocked positions by a door mounted, electric motor driven remote actuator. In a more recent power door lock proposal, a small electric motor, mounted in a housing with its axis of rotation oriented in the width direction of the housing, is connected to a linear actuator shiftable in the length direction of the housing through a reduction gear train, a rack and pinion gear set, and a linear detent clutch. The detent provides a releasable connection between the motor driven rack and the linear actuator whereby the latter is power driven between positively defined limit positions. In either limit position of the linear actuator, the motor overdrives the rack to actuate the detent clutch to release the linear actuator so that the motor can park the rack in a position wherein subsequent movement of the linear actuator in a back driven mode is not obstructed by the detent clutch. A remote actuator according to this invention embodies similar performance characteristics in a structural arrangement particularly suited for automotated assembly and, therefore, represents a novel and attractive alternative to known remote actuators.

SUMMARY OF THE INVENTION

Accordingly, the primary feature of this invention is that it provides a new and improved remote actuator particularly suited for automated assembly. Another feature of this invention resides in the provision in a housing of the new and improved remote actuator of a three tier motor, gear reduction, rotary detent clutch, and linear actuator arrangement which provides a particularly low profile and the components of which are each sequentially assembleable through a common open side of the housing. Yet another feature of this invention resides in the provision in the new and improved remote actuator of a double reduction gear train including a first reduction in the inboard tier and a second reduction in the middle tier, a pancake type motor and a rotary detent clutch in the middle tier, and a linear actuator in the outboard tier adjacent a cover over the open side of the housing driven by the motor through the reduction gear train and the detent clutch. Still another feature of this invention resides in the provision in the new and improved remote actuator of an output gear of the reduction gear train disposed in the middle tier with a rotary detent clutch nested therein and in the provision of a rack pinion connected to the detent clutch straddling the middle and outboard tiers and engaging rack gear teeth on the linear actuator whereby the linear actuator is releasably driven between limit positions by the output gear through the detent clutch. And still another feature of this invention resides in the provision in the new and improved remote actuator of a positive stop on the housing cover engageable by an arm on the output gear after the linear actuator reaches either limit position thereby to define a parked position for the output gear wherein the detent clutch does not interfere with subsequent movement of the linear actuator in a back driven mode.

These and other features of the invention will be readily apparent from the following specification and from the drawings wherein.

Figure 1:
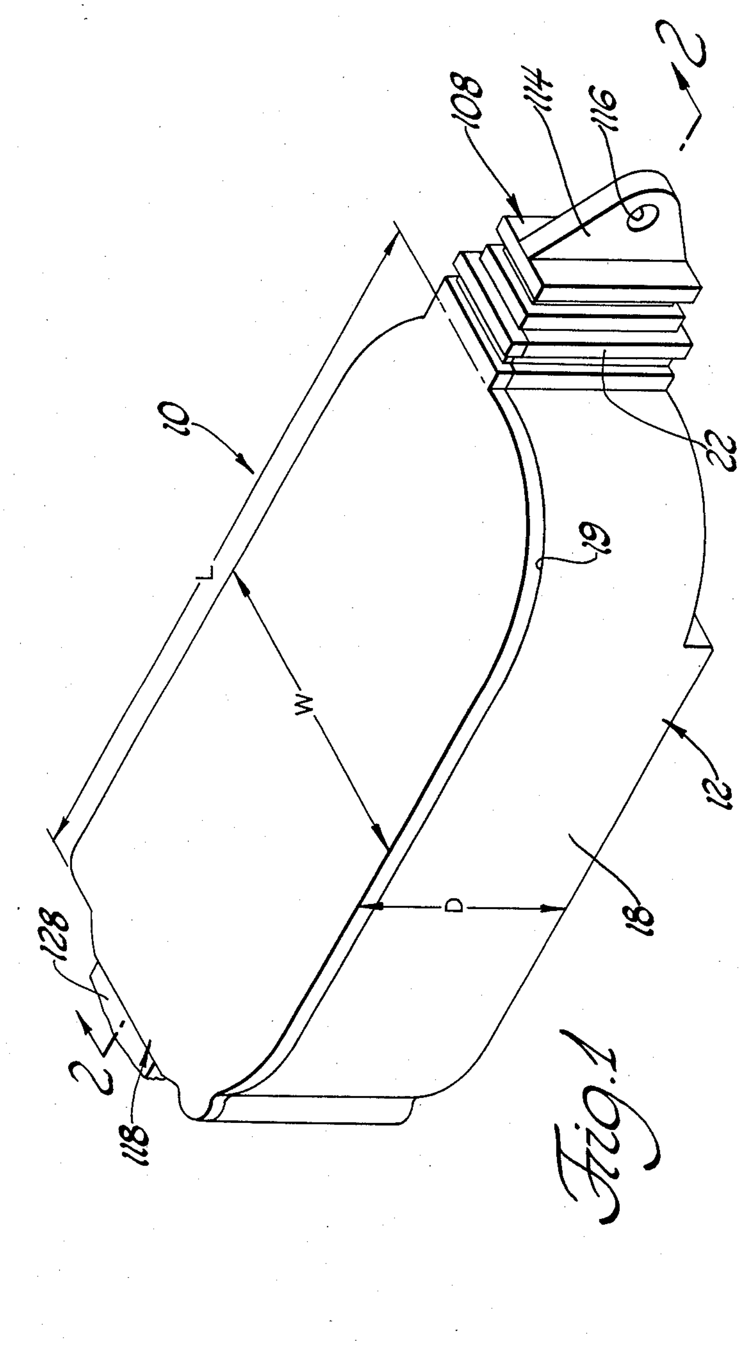
FIG. 1 is a perspective view of a remote actuator according to this invention.
Figure 2:
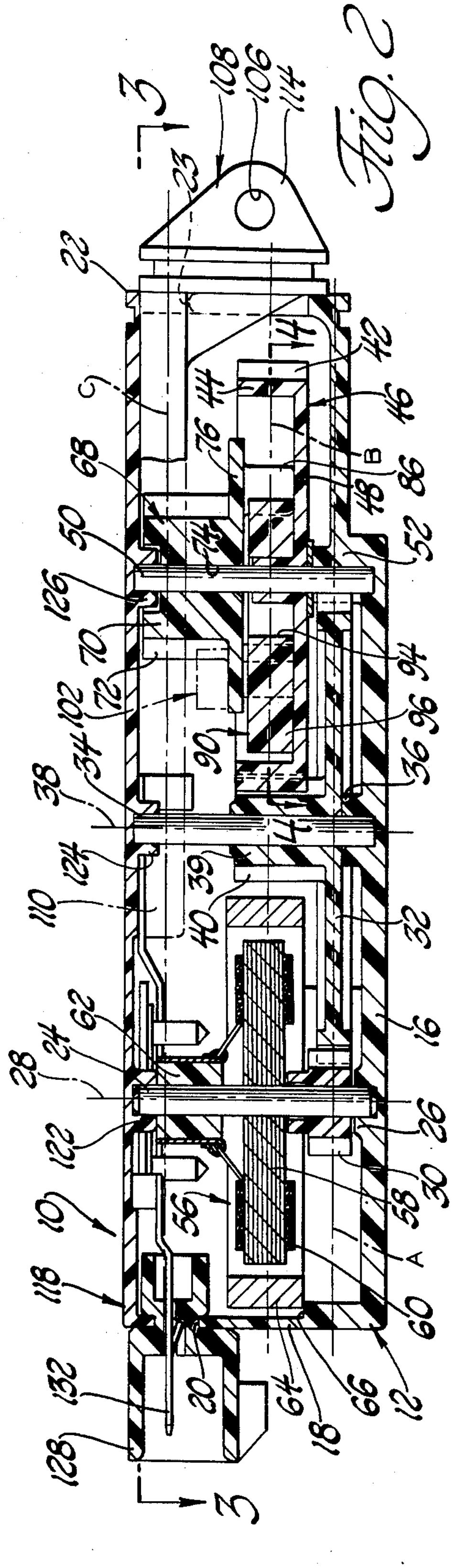
FIG. 2 is an enlarged sectional view taken generally along the plane indicated by lines 2—2 in FIG. 1.

Referring, now, to FIGS. 1 and 2 of the drawings, a remote actuator 10 according to this invention includes a generally rectangular housing 12 having a dimension D in the depth direction, a dimension W in the width direction, and a dimension L in the length direction. For maximum compactness, dimension D is substantially less than either of dimensions W and L and W is less than L. The housing 12 includes a planar base 16 and an integral side wall 18 perpendicular to and extending around the base 16. The base 16 defines a closed side of the housing 12 while an outboard edge 19 of the side wall 18 defines the boundary of an outboard, open side of the housing. The side wall 18 has a notch 20 therein at one end and a neck portion 22 with a rectangular notch 23 therein at the opposite end. The neck portion 22 is located asymmetrically on the housing relative to the center of the housing in the width direction W.

Figure 3:
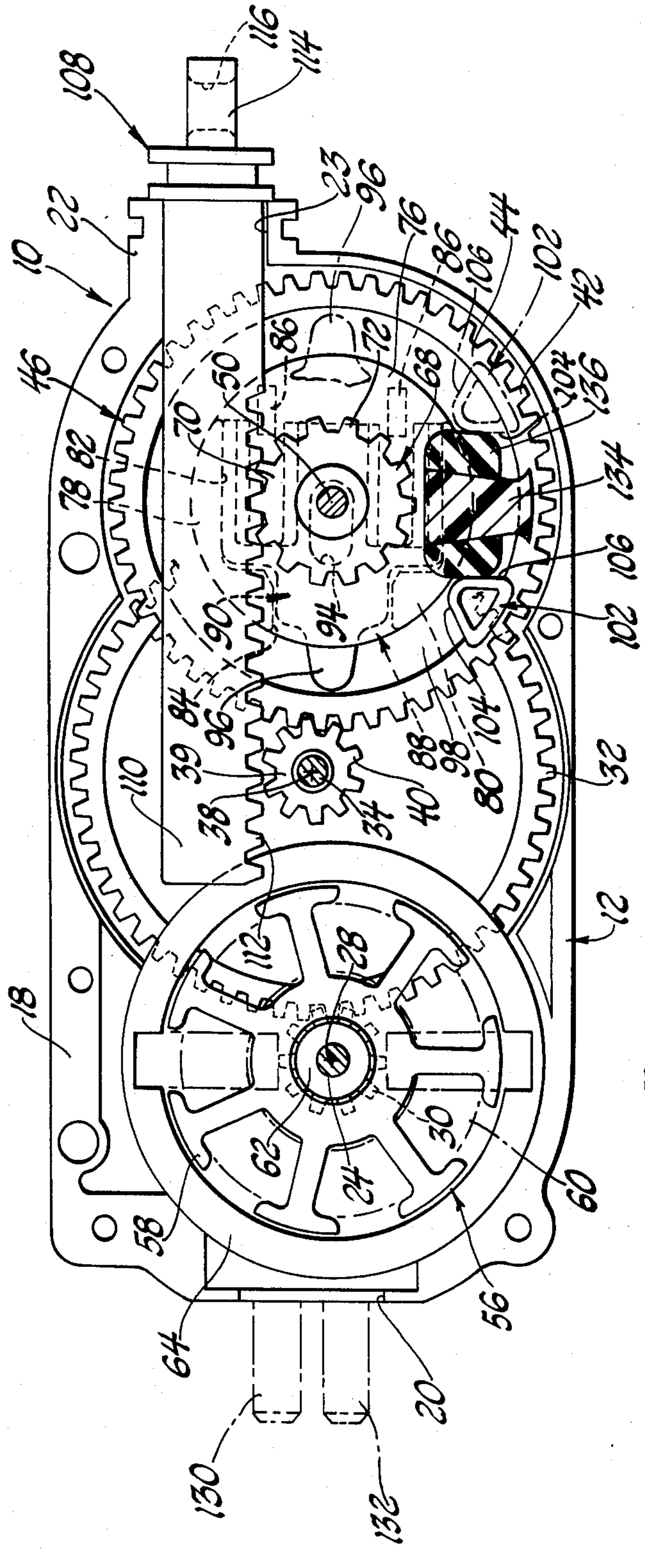
FIG. 3 is a sectional view taken generally along the plane indicated by lines 3—3 in FIG. 2.

As seen best in FIGS. 2 and 3, the interior of the housing 12 has three planar tiers parallel to planar base 16 represented as an inboard tier A, a middle tier B, and an outboard tier C, FIG. 2. A motor armature shaft 24 is supported in a boss 26 on the planar base for rotation about an axis 28 perpendicular to the base. A pinion 30 on the armature shaft rotates in the inboard tier A and meshes with an intermediate gear 32 in the inboard tier A. The intermediate gear is supported on an intermediate shaft 34 disposed in a boss 36 on the planar base for rotation about an axis 38 perpendicular to the planar base. The pinion 30 and intermediate gear 32 define a first gear reduction stage in the inboard tier A. The intermediate gear 32 has a hub 39 with gear teeth 40 thereon straddling the inboard and middle tiers A and B, respectively. Gear teeth 40 mesh with corresponding gear teeth 42 on the outside of a right cylindrical flange portion 44 of an output gear 46 in tier B. The output gear 46 has a disc-like center web 48 inboard of and integral with the flange 44 and is supported on an output gear shaft 50 in a boss 52 in the planar base. The gear teeth 40 on the hub 39 of the intermediate gear and the teeth 42 on the output gear define a second gear reduction stage in the middle tier B.

With continued reference to FIGS. 2 and 3, the remote actuator 10 further includes a flat or pancake type electric motor 56 having a 7-spoked armature core 58 in middle tier B rigidly attached to the armature shaft 24 for rotation as a unit therewith. The spokes of the core support conventional armature windings, illustrated schematically at 60 in FIG. 2, so that each of the spokes forms a magnetic pole when the windings are energized. In conventional fashion, each of the windings is electrically connected to a corresponding segment on a commutator 62 supported on the armature shaft 24 generally in outboard tier C for rotation as a unit with the armature shaft. The magnetic poles defined at the spokes of the armature core interact with magnetic poles formed in a cylindrical permanent magnet 64 disposed in middle tier B on a ledge 66, FIG. 2, formed on the interior of sidewall 18 of the housing, the ledge extending far enough around the permanent magnet for adequate support thereof but not so far as to interfere with intermediate gear 32 in inboard tier A. Accordingly, energization of the windings 60 effects rotation of the armature shaft 24 whereby pinion 30 drives intermediate gear 32 and output gear 46 through two stages of gear reduction.

Figure 4:
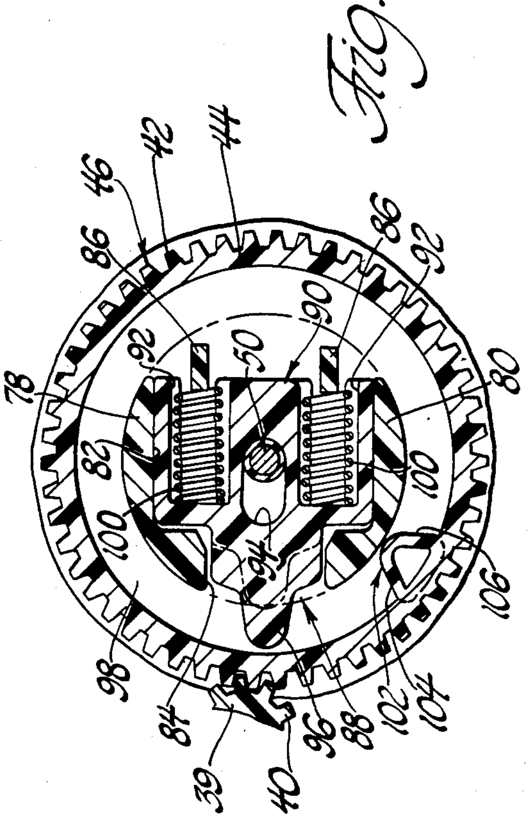
FIG. 4 is a sectional view taken generally long the plane indicated by lines 4—4 in FIG. 2.

As best seen in FIGS. 2, 3, and 4, a rack pinion 68 straddling the middle and outboad tiers B and C, respectively, includes a hub portion 70 on which are formed a plurality of gear teeth 72. A bore 74 through the hub portion receives the shaft 50 whereby the rack pinion is supported on the housing for rotation about the axis 54 independently of the output gear 46. A circular flange 76 integral with the hub portion 70 is disposed in middle tier B within the right circular flanage 44 of the output gear 46 and includes a pair of integral symmetrical lugs 78 and 80 which bear against the web 48 of the output gear. The lugs 78 and 80 cooperate with the flange 76 of the rack pinion and the web 48 of the output gear in defining a generally rectangular chamber 82, FIG. 4, which is open between the lugs through a neck 84. A pair of spring supports 86 integral with the flange 76 of the rack pinion project perpendicular to the flange generally at the end of rectangular chamber 82 opposite neck 84.

As seen best in FIGS. 3 and 4, the remote actuator 10 further includes a detent clutch 88 in the middle tier B between the output gear 46 and the rack pinion 68. The detent clutch 88 includes a sliding detent 90 in the chamber 82. The sliding detent has a pair of parallel notches 92, an elongated slot 94, and a follower 96 projecting through the neck 84 of the chamber 82 into an annular channel 98 defined between the flange 44 on the output gear and the lugs 78 and 80. The notches 92 register with the spring supports 86 on the rack pinion and the slot 94 receives the shaft 50 therethrough so that the detent is rotatable with the rack pinion and slidable relative thereto between the lugs 78 and 80 between one position, shown in solid lines in FIG. 4, wherein the follower 96 projects into the annular channel 98 and another position, shown in broken lines in FIG. 4, wherein the follower 96 is disposed substantially in the neck 84 between the lugs 78 and 80. A pair of coil springs 100 in the notches 92 seat at one end against the spring supports 86 and at the other end against the detent 90 thereby biasing the detent to the solid line position shown in FIG. 4.

The detent clutch 88 further includes an arm 102 integral with the output gear 46 and disposed generally in the middle tier B. The arm has a pair of converging faces 104 and 106, FIG. 4, disposed in the annular channel 98. The arm 102 engages the follower 96 on one of the faces 104 and 106 depending on the direction of rotation of the output gear to rotate the rack pinion as a unit with the output gear in the corresponding direction. The output gear 46 overdrives the rack pinion when the latter is immobilized because the angles of the faces 104 and 106 on the arm 102 operate to cam the follower 96 and the sliding detent 90 radially inward against the springs 100 allowing the arm 102 to pass over the follower.

As seen best in FIGS. 1, 2 and 3, a linear actuator 108 of the remote actuator 10 has an elongated, generally rectangular body 110 slidably disposed in the rectangular notch 23 formed in the wall 18 of the housing 12. The rectangular body 110 of the linear actuator has a plurality of rack gear teeth 112 formed on the side thereof closest to and meshing with the gear teeth 72 on the rack pinion 68 whereby rotation of the rack pinion projects the linear actuator 108 in and out of the housing 12 through the notch 23. An L-shaped end 114 on the linear actuator 108 outside the housing has a flange with an eye 116 therethrough for attachment to external linkage.

The open side of the housing 12 defined at the edge 19 of side wall 18 is closed by a cover 118 having a plurality of bosses 122, 124 and 126 thereon which rotatably support the free ends of shafts 24, 34 and 50 respectively. In addition, the cover supports a connector body 128 which is received in the notch 20 in the side wall 18 of the housing 12 when the cover is installed. The connector body supports a pair of terminals 130 and 132 which project into the housing 12 and connect to a corresponding pair of brushes in brush holders, not shown, supported on the cover for engagement on the commutator 62 when the cover is installed. The terminals 130 and 132 are adapted for connection to a vehicle wiring harness, for example, whereby the armature core 58 can be energized to rotate the armature shaft in opposite directions. The cover 118 further includes an integral upstanding abutment 134, FIG. 3, in the outboard tier C obstructing the path of movement of the arm 102 on the output gear 46. The abutment 134 has a cushion 136 thereon fabricated of rubber or like resilient material.

In a vehicle power door lock application, the remote actuator 10 is located in the interior of a door with the housing 12 rigidly attached by conventional means to the door structure and with the eye 116 of the linear actuator connected by appropriate linkage to a lock/unlock lever of the door latch assembly. Typically, the lock/unlock lever of the door latch assumes either of two positions corresponding to the locked and unlocked conditions of the latch and, through the linkage, positively limits movement of the linear actuator 108 in both the extending and retracting directions, rightward and leftward respectively in FIGS. 1, 2 and 3. In addition, the door latch includes a manually operable control whereby the lock/unlock lever is manually positioned in either the locked or unlocked positions independently of the linear actuator 108.

Proceeding, now, to describe a typical operational cycle for the remote actuator 10 in a power door lock application, it is initially assumed that locking of the latch corresponds to extending movement of the linear actuator 108, that unlocking of the latch corresponds to retracting movement of the linear actuator, that the vehicle door is closed but the latch unlocked, and that the components of the remote actuator assume the positions shown in solid lines in FIGS. 2, 3 and 4. To power lock the latch, a manually operated control switch, not shown, is closed to energize the armature core 58 for rotation of the armature shaft 24 and pinion 30 clockwise, FIG. 3, whereby the output gear 46 is driven clockwise through two stages of gear reduction. The output gear 46 initially rotates independently of the rack pinion 68 until face 104 on arm 102 engages follower 96 on the sliding detent 90. Thereafter, the output gear and the rack pinion rotate clockwise, FIG. 3, as a unit while teeth 72 on the rack pinion project the linear actuator 108 in the extending direction. When the lock/unlock lever in the latch achieves the locked position, extension of the linear actuator is arrested by the connecting linkage and the detent assumes the position shown in broken lines in FIG. 3. Rotation of the rack pinion 68 is likewise arrested through to meshing of the teeth 112 on the linear actuator and the teeth 72 on the rack pinion. Because the armature core 58 is still energized, the output gear overdrives the rack pinion causing the face 104 on the arm 102 to cam the follower inward until the arm passes over the follower. Thereafter, the output gear 46 rotates until the arm 102 encounters cushion 136 on the abutment 134 which defines a parked position of the output gear, shown in broken lines in FIG. 3. The motor 56 is deenergized when the output gear is parked.

With the output gear thus parked, the arm 102 does not obstruct movement of the detent back toward the position corresponding to the unlocked condition of the latch. Accordingly, when the lock/unlock lever is subsequently manually manipulated from the locked to the unlocked position, the linkage to the linear actuator 108 back drives the latter in the retracting direction and the rack pinion 68 and detent 90 counterclockwise, FIG. 3, to the solid line positions shown in FIG. 3. Further manual manipulation of the lock/unlock lever back to the locked position results in the linear actuator 108 being back driven in the extending direction and the rack pinion 68 and detent 90 clockwise, FIG. 3, to the broken line positions shown in FIG. 3.

From the locked condition of the latch, power unlock is initiated by activation of the motor switch to energize the armature core 58 to rotate the armature shaft 24 and the pinion 30 counterclockwise, FIG. 3, and the output gear 46 counterclockwise through the two stages of gear reduction. Initially, the output gear rotates independently of the rack pinion 68 until face 106 of the arm 102 engages the follower 96 on the detent 90 whereupon the output gear and rack pinion rotate counterclockwise as a unit while the linear actuator 108 is driven in the retracting direction. When the lock/unlock lever achieves the unlocked position, further motion of the linear actuator 108 in the retracting direction is arrested through the connecting linkage and the rack pinion is stalled. Because the armature core remains energized, the output gear 46 overdrives the rack pinion in the counterclockwise direction as face 106 cams the detent 90 inwardly until the arm 102 passes over the follower 96. The output gear continues to rotate until the arm 102 engages the abutment 134 which defines a parked position for the output gear in the counterclockwise direction of rotation and in which the armature core is deenergized. Again, with the arm 102 thus parked against the abutment, the lock/unlock lever may be manually manipulated without interference between the follower 96 and the arm 102.

In the event that the output gear 46 and the linear actuator 108, the rack pinion 68, and the detent 90 are positioned oppositely, i.e. the linear actuator is extended corresponding to the locked condition of the latch and the arm 102 parked against the abutment 134 corresponding to the unlocked condition of the latch for example, the motor control switch can still be cycled without problems. More particularly, if the motor switch is cycled to energize the armature core 58 to rotate the output gear clockwise, FIG. 3, the latter rotates freely until face 104 engages follower 96 on the detent 90. Because further movement of the linear actuator 108 in the extending direction is prevented, the output gear 46 overdrives the rack pinion 68 as described hereinbefore and continues to rotate until the arm 102 once again parks against the abutment 134. The same sequence of events occurs, of course, when the initial positions of the output gear and rack pinion are reversed.

The three tier arrangement of components within the housing 12 renders the remote actuator 10 exceptionally well suited to automated assembly procedure. More particularly, the components are installed in the housing one tier at a time, all from the same side of the housing, and the housing is closed by a single cover member to complete the assembly. In a typical assembly sequence, the intermediate gear in the inboard tier A is installed in the housing first. The middle tier B components including the output gear 46, with detent 90 and rack pinion 68 already mounted thereon, and the motor field magnet 64 and armature shaft 24, with pinion 30 and core 58 thereon, are then simultaneously installed over inboard tier A. The linear actuator 108, an outboard tier C component, is then disposed in the notch 23 in the housing 12 with teeth 112 meshing with teeth 72 on the rack pinion. Finally, the cover 118 with the connector 128, the terminals 130 and 132 and the motor brushes and required connections already assembled, is placed over the open side of housing 12 thereby capturing the linear actuator 108 in the notch 23 and each of the shafts 24, 34 and 50 in the bosses 122, 124 and 126, respectively, to rigidify the entire system. In addition, the motor brushes in outboard tier C automatically engage the commutator 62 completing the motor assembly in preparation for energization. Conventional fastening means, not shown, such as screws are then applied to retain the cover on the housing.

The embodiments of the invention in which an exclusive property or priviledge is claimed are defined as follows:

1. A remote actuator comprising, a housing including a planar base and a side wall perpendicular to said base defining an open side of said housing, said housing having a depth dimension perpendicular to said base substantially less than a length dimension parallel to said base, a first pinion gear rotatably supported on said housing is a first tier thereof adjacent said base, an intermediate gear rotatably supported on said housing in said first tier and meshing with said first pinion thereby to define a first gear reduction stage, a second pinion rotatably supported on said housing in a second tier thereof adjacent said first tier and rotatable as a unit with said intermediate gear, an output gear rotatably supported on said housing in said second tier and meshing with said second pinion thereby to define a second gear reduction stage, reversible electric motor means in said second tier connected to said first pinion and operative to drive said output gear in opposite directions between a pair of parked positions, a linear actuator in a third tier of said housing between said second tier and said open side bodily shiftable in either one of an extending direction and a retracting direction parallel to said length dimension between positively defined limits, means on said linear actuator defining a plurality of rack gear teeth, a rack pinion rotabaly supported in said housing in said third tier and meshing with said rack teeth whereby said rack pinion drives said linear actuator in either of said extending and said retracting directions, a slidable detent supported on said rack pinion for rotation as a unit therewith and for bodily shiftable movement relative thereto in a plane perpendicular to the axis of rotation of said rack pinion between an extended position and a retracted position, spring means between said rack pinion and said detent biasing said detent toward said extended position, means defining a follower on said detent, and means on said output gear defining a rigid arm having a pair of converging faces each engageable on said follower in a corresponding one of the directions of rotation of said output gear whereby said rack pinion is rotatable as a unit with said outpur gear while said converging faces are operable to cam said detent to said retracted position when said rack pinion is immobilized thereby to permit continued rotation of said output gear to the corresponding one of said parked positions.

2. The remote actuator recited in claim 1 wherein said reversible electric motor means includes a pancake-type armature core rotatably supported on said housing in said second tier and surrounded by an annular permanent field magnet disposed on said housing in said second tier.

* * * * *